United States Patent [19]

Ziegelmeyer

[11] Patent Number: 4,594,920
[45] Date of Patent: Jun. 17, 1986

[54] GRINDING MACHINE FOR GRINDING CUTTER IN CUTTER LINKS

[76] Inventor: Lynn J. Ziegelmeyer, 113 Cottage, Apt. 2A, Medford, Oreg. 97501

[21] Appl. No.: 665,780

[22] Filed: Oct. 29, 1984

[51] Int. Cl.⁴ ............................................. B23D 63/16
[52] U.S. Cl. ........................................................ 76/42
[58] Field of Search ...................... 76/25 A, 37, 41, 42

[56] References Cited

U.S. PATENT DOCUMENTS

| | | | |
|---|---|---|---|
| 4,287,793 | 9/1981 | Silvey | 76/42 |
| 4,299,142 | 11/1981 | Kaye | 76/42 |
| 4,336,726 | 6/1982 | Silvey | 76/25 A |
| 4,416,169 | 11/1983 | Silvey | 76/37 |

FOREIGN PATENT DOCUMENTS 2347141 12/1977 France ..................................... 76/42

Primary Examiner—Roscoe V. Parker
Attorney, Agent, or Firm—Kolisch, Hartwell & Dickinson

[57] ABSTRACT

A grinding machine for grinding the cutters of cutter links. A cam-acting chain positioner is operable to force a cutter link downwardly against a support for the link. To grind a cutter, the chain positioner is actuated to move the cutter and the support for the cutter in a direction causing the edge of a grinding wheel to come against the cutting edge of the cutter. The mechanism is such that the grinding wheel protrudes farther into the gullet of the cutter link with greater movement of the support in a direction producing grinding of the cutter.

11 Claims, 5 Drawing Figures

U.S. Patent Jun. 17, 1986 Sheet 1 of 2 4,594,920
FIG. 2
FIG. 1
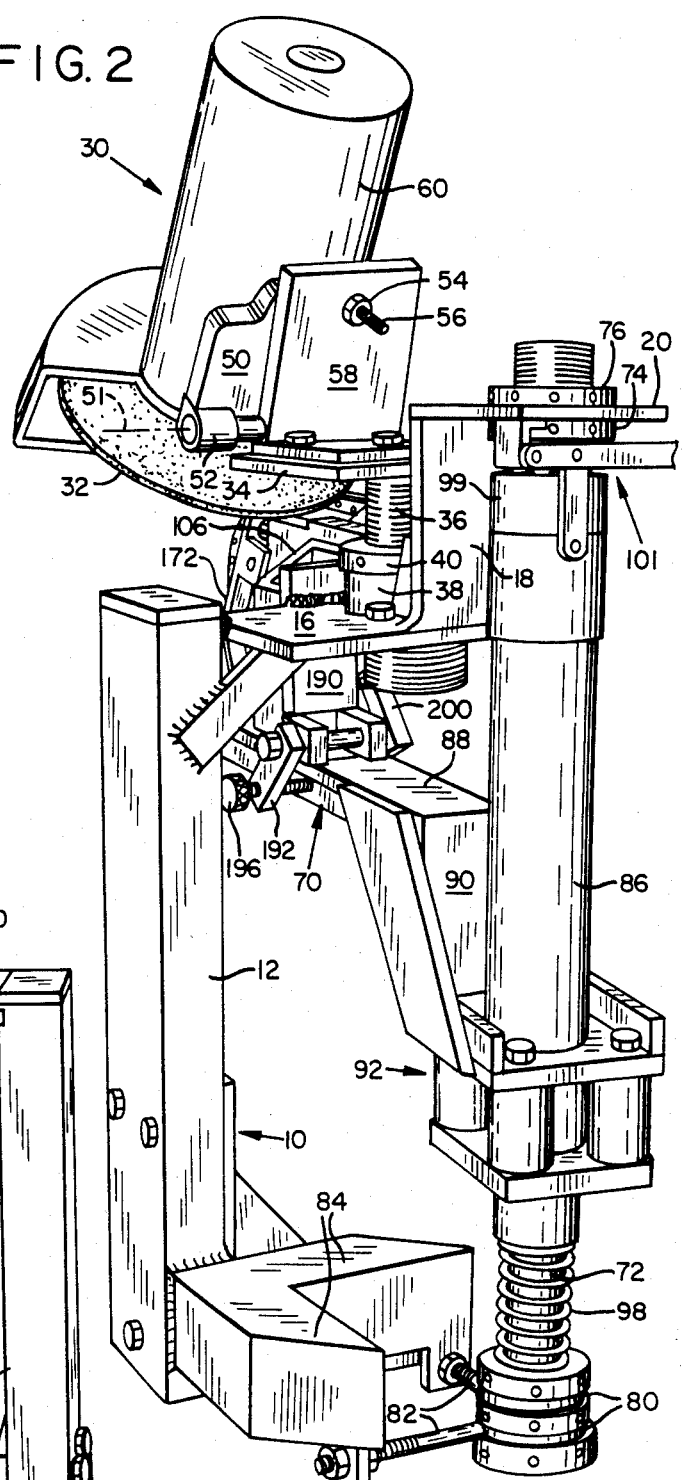
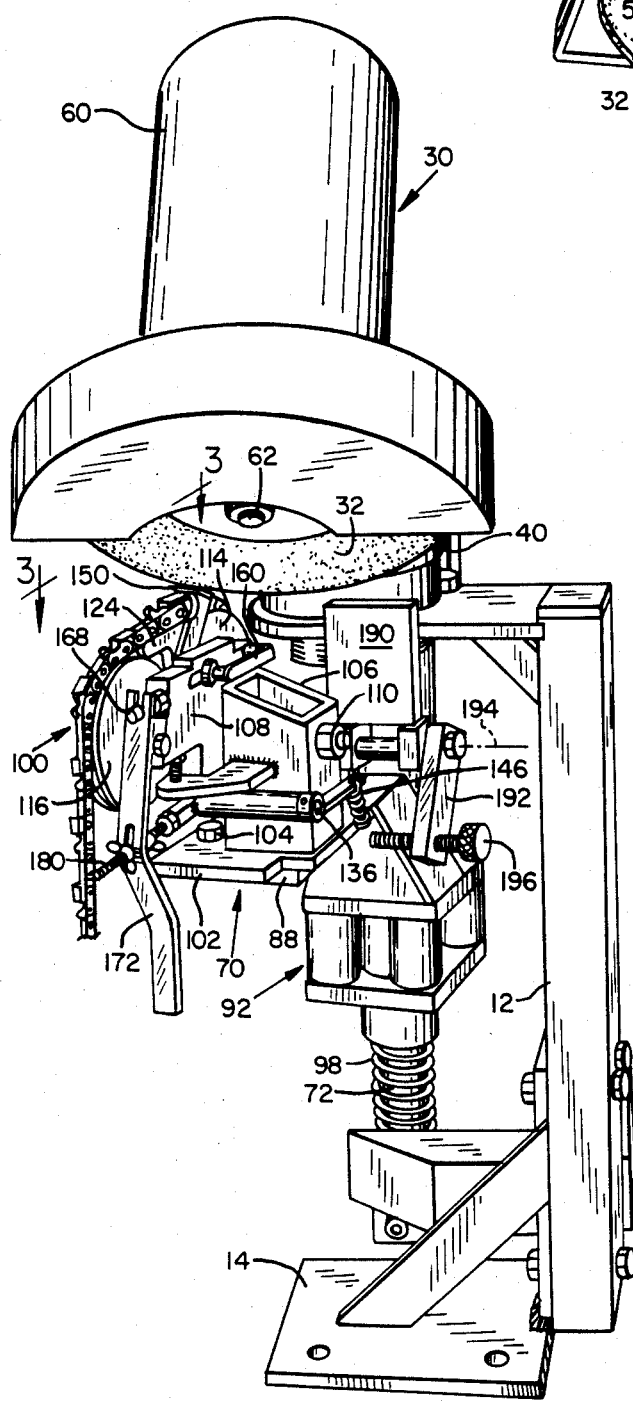

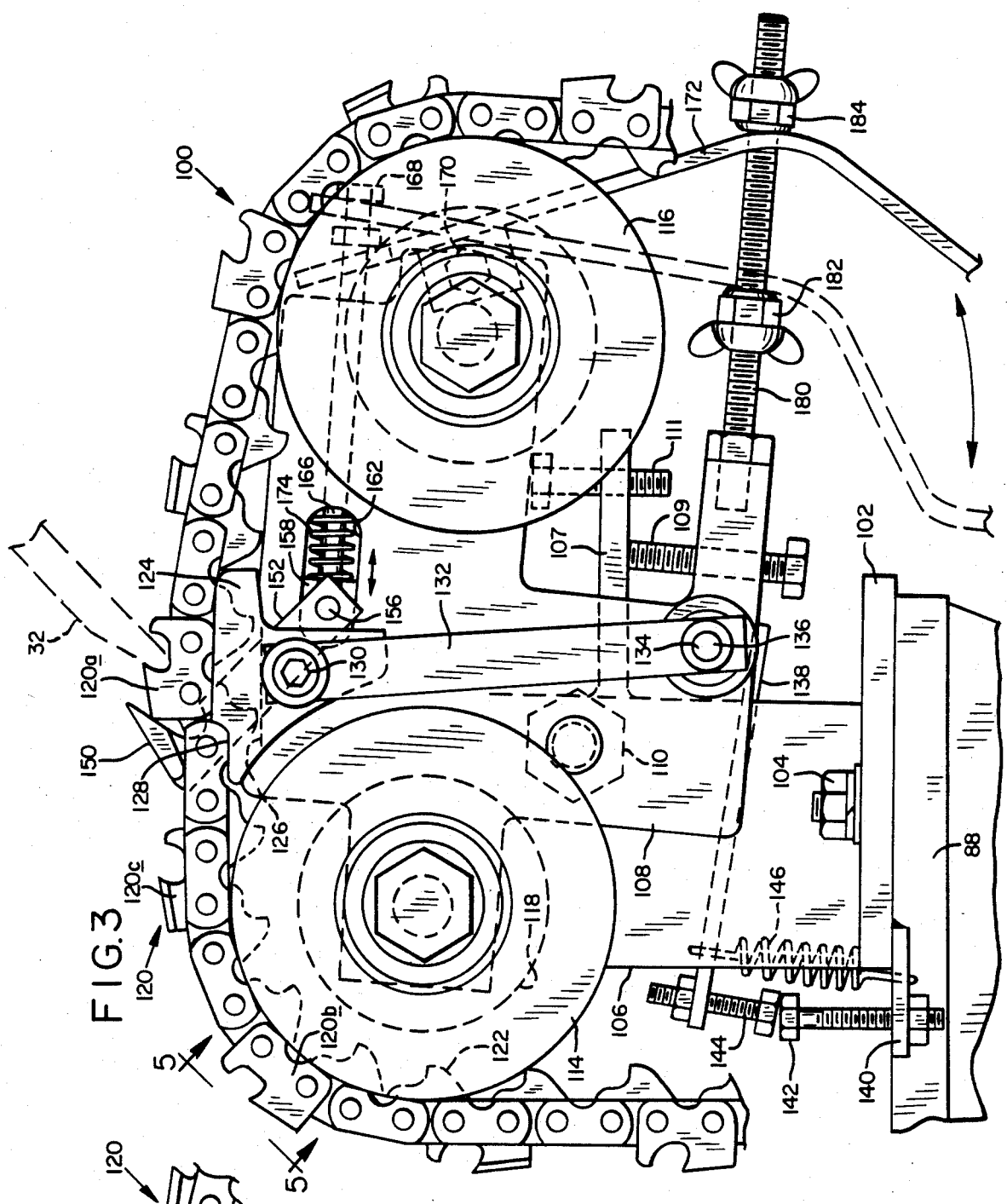

GRINDING MACHINE FOR GRINDING CUTTER IN CUTTER LINKS

BACKGROUND AND SUMMARY OF THE INVENTION

This invention relates to a grinding machine for grinding saw chain, and more particularly to a grinding machine for grinding the cutters that form a part of cutter links in a saw chain and that produce the cutting action when a saw chain moves through wood.

The usual cutter link in conventional saw chain includes what is referred to herein as a body portion forming the base of the link, which receives the rivets connecting the cutter link to other links in the chain. Projecting upwardly from this body portion at the forward end of the link is a depth gauge. Disposed rearwardly of this depth gauge, and separated from the depth gauge by a gullet, is the cutter of the cutter link, which includes a side flange portion projecting upwardly form the body portion of the link and joining with this side flange portion a top plate or toe portion. In so-called chisel chain the top plate and side flange join at a sharp angle, whereas in so-called chipper chain the joinder is not at a sharp angle but over a curved round. The leading portion of the cutter, be it chipper or chisel type chain, including the top plate and its side flange portion, is ground to have a sharp cutting edge, and it is this cutting edge which produces the cutting action when the saw chain is pulled through wood.

It is important in precisely grinding cutters in cutter links that the cutter link which includes the cutter be precisely and firmly held with movement of a cutter against a grinding surface to produce the sharpening action. A general object of this invention is to provide an improved system for supporting a cutter link and holding it in place during the grinding a cutter link and holding it in place during the grinding operation.

Another object is to provide an improved system or means for holding a cutter link during its grinding which is readily released to permit successive cutters to be moved into what is referred to herein as a pre-grinding position in the grinding machine, and which is then actuatable quickly to hold firmly the cutter link on a support for the link and move the link so that its cutter advances into a grinding surface of a grinding wheel.

In a conventional cutter link, the cutter which extends in a new link typically form approximately midway between the ends of the link to the rear of the link, slopes downwardly progressing toward the rear end of the cutter. As a consequence, with older chain, where the length of the cutter has been reduced by reason of repeated grindings for sharpening purposes, proper grinding of a cutter occurs with the edge of the grinding wheel which produces the grinding extending farther into the gullet of the cutter link and toward the body of the link than is the case with the grinding of new chain. In grinding machines it is possible to make adjustments whereby with a cutter link having a relatively short cutter the grinding wheel may be positioned to extend farther into the link. However, there are obvious advantages in a machine where the penetration of the grinding wheel edge into the cutter link adjusts automatically, with a deeper penetration occurring with the grinding of cutter links having relatively short cutters than occurs with cutter links having long or relatively new cutters. An object of this invention, therefore, is to provide in a grinding machine a construction which produces this type of adjustment automatically.

Another object of this invention is to provide a grinding machine with improved means for supporting and moving a cutter link from a pre-grinding position to advance the cutter of the link against the margin of a grinding wheel. The structure contemplated in a preferred embodiment of the invention includes a support for a cutter link, a pivot mounting for the support whereby it moves in an arc carrying any link held thereon upwardly and against the margin of a protruding grinding wheel, and a cam-acting positioner engageable with the top and rear of the cutter in the link which operates to hold the link firmly in place and through movement of the positioner to produce movement of the link whereby its cutter moves against the margin of a grinding wheel.

These and other objects and advantages are obtained by the invention, which is described below in conjunction with the accompanying drawings, wherein:

BRIEF DESCRIPTION OF THE DRAWINGS

FIG. 1 is a perspective view illustrating a grinding machine constructed according to the invention, viewing the front of the machine;

FIG. 2 is a perspective view, viewing the rear of the machine illustrated in FIG. 1;

FIG. 3 is an enlarged view, taken generally along the line 3—3 in FIG. 1, illustrating the front side of mechanism in the grinding machine for supporting a saw chain and which is actuatable to advance a cutter link for the purpose of grinding its cutter;

FIG. 4 illustrates a saw chain support member and the arm that mounts it, which is part of the mechanism shown in FIG. 3, with the member and arm shifted from the position that they have in FIG. 3; and FIG. 5 is a view, taken generally along the line 5—5 in FIG. 3, looking down at the top of a cutter link.

Referring now to the drawings, the grinding machine illustrated comprises an upstanding main frame 10 which supports the machine on a floor or other support. This main frame includes an upstanding beam member 12, a pad 14 secured to the base of this beam member 12 which rests on the floor or other support, horizontal platform structure 16 suitably secured to beam member 12 adjacent its top end and projecting laterally of this beam member, and L-shaped bracket structure 18 suitably secured to the platform structure adjacent a margin of the platform structure which includes, as an upper part thereof, a horizontal deck portion 20. As indicated, all of these elements are secured together to form an integrated structure.

The grinding machine further includes a power-driven grinding wheel assembly designated generally at 30 including a grinding wheel 32 which is rotated under power to produce grinding of the cutters and successive cutter links.

Considering the construction of the grinding wheel assembly in more detail, disposed above platform structure 16 is a table 34. Appropriately secured to the base of this table, and projecting downwardly therefrom, is a threaded element 36. Platform structure 16 is provided with a sleeve 38, and the threaded element extends downwardly through the interior of this sleeve with the element slidable up and down in the sleeve. While slidable up and down in the sleeve, the element is keyed (by means not shown) so as to be nonrotatably supported in the sleeve. A nut 40 screwed onto the threaded element and resting on the top of the sleeve when turned adjusts in small increments the vertical height of the element within the sleeve. In this way, the table is held in its position disposed above the platform structure, with the table being vertically moveable for the purpose of adjusting the height of the grinding wheel, either up or down.

A motor-mounting plate 50 is connected through hinge connection 52 with the forward end of table 34. The hinge connection permits relative pivotal movement of the motor-mounting plate about an axis indicated at 51. Connected to the motor-mounting plate is a threaded shaft 56 which extends outwardly from the motor-mounting plate and through the upper part of a bracket 58 fixed to table 34. Nuts, exemplified by nut 54, are screwed onto shaft 56, with one on one side and one on the other side of bracket 58. The incline of motor-mounting plate is set in different adjusted positions by adjusting the positions of these nuts on shaft 56.

An electric motor 60 is mounted on plate 50. Its output shaft 62 mounts grinding wheel 32, with the wheel having the inclined positioned shown.

Shown at 70 is a swingable frame which is utilized in the support of saw chain during the sharpening of its cutter links.

Describing this swingable frame and its mounting in the machine, disposed rearwardly in the machine and spaced behind sleeve 38 is an upright post 72. The upper end of this post passes through an accommodating bore provided in deck 20 of bracket structure 18, and nuts 74 and 76 screwed onto the threaded upper end of this post are tightened against opposite sides of deck 20 to secure the upper end of the post in place. The lower end of the post is held in a fixed position adjacent the base of the machine through collars 80 encircling and secured to the bottom end of the post mounted on struts 82 extending from frame pieces 84 which are an integral part of main frame 10. In this manner, the post is held in an upright fixed position adjacent the rear of the machine.

An elongate sleeve 86 encircles the post in a region intermediate where the post is supported on the main frame. Swingable frame 70 includes a horizontal expanse 88 joining with a depending section 90 at the rear end thereof, the latter being fixed to the bottom portion of sleeve 86 through bracing structure 92. Thus, the swingable frame and the sleeve move as one in the machine, with the sleeve being rotatable about the axis of post 72 and the swingable frame being swingable about this axis while moving in a horizontal plane.

This movement of swingable frame 70 is relied upon to accomplish at least two purposes in the grinding machine disclosed.

One result obtained by the inclusion of the swingable frame is the capability of enabling the frame to be positioned whereby its forward end is located either on one side or on the other side of the grinding wheel disposed above the swingable frame. Left- and right-hand cutter links in saw chain have cutters which are sharpened in oppositely inclined directions. Thus, and referring to FIG. 3, the chain generally shown at 120 therein has cutter links exemplified by link 120*b* which are right-hand links, where the flange 94 of the link which joins with toe portion 95 is located on the right side of the link viewing the link from its rear end. Left-hand cutter links, exemplified by link 120*c*, have flanges which are located on the left-hand side of the link viewing the link from its rear end. In right-hand cutter links, as illustrated in FIG. 5, the toe portion of the link is sharpened along the line 96 indicated which is inclined in one direction with respect to the longitudinal axis of the link. The sharpened leading edges of the toe portions in the links of opposite hand, i.e. left-hand cutter links, incline in the opposite direction than the incline shown in FIG. 5. With the swingable frame located generally to one side of the grinding wheel, i.e. to the left side of the axis of the grinding wheel as the machine is illustrated in FIG. 1, the cutters in right-hand cutter links are ground. With swinging of the frames so that the chain is located to the right side of the axis of the grinding wheel, the cutters in left-hand cutter links are ground.

As will be gone into in greater detail, the frame is also swung to place the edge of the grinding wheel within the gullet of a tooth being ground. This movement is not substantial, a matter of only a few degrees, and occurs with the swingable frame always located on one side of the grinding wheel, the particular side being dependent upon the hand of the cutter link being sharpened.

The mechanism for mounting the saw chain being ground, and for positioning and supporting a cutter link in the chain during the grinding of the cutter in this cutter link, is indicated in the drawings generally at 100. As illustrated in FIG. 1, this mechanism is supported on horizontal expanse 88 of swingable frame 70, adjacent the free end of this horizontal expanse.

Sleeve 86 is urged upwardly on post 72 by coil spring 98 encircling a lower portion of the post and interposed between the lower end of the sleeve and collar structure 80. The spring urges the sleeve upwardly against stop 99 secured to the post adjacent its upper end. Lever structure 101 may be manually operated to push sleeve 86 downwardly against the thrust of the coil spring, thus to lower the post and the swingable frame which is secured thereto. This adjustment is provided to enable the swingable frame to be shifted from one to the other side of the grinding wheel axis, with clearance being provided with lowering of the frame whereby the frame and mechanism 100 may move freely under the wheel.

Considering details of the structure of mechanism 100, and referring now also to FIG. 3, forming the base thereof is a base plate 102. This base plate is secured to expanse 88 in a suitable manner, as by the nut and bolt assembly shown at 104.

Suitably secured as by welding to this base plate is an upstanding box-shaped frame 106. A verticaly disposed frame plate 108 is secured to a side of the box-shaped frame 106 by a fastener 110 which extends through the box-shaped frame and into the frame plate.

Further aiding in the positioning of frame plate 108 on box-shaped frame 106 is the provision of lug 107 which is fastened as by welding to box-shaped frame 106. Lug 107 has its unattached end positioned by adjustable abutment 109 adjustably mounted in a portion of the frame plate and having it upper end engaging the lower side of the lug, and adjustable abutment 111 adjustably mounted in the lug and having its upper end abutting another portion of the frame plate.

With continued reference to FIG. 3, journaled on the frame plate adjacent opposite extremities thereof are a pair of pulleys or wheels, indicated at 114, 116. Each of these has a groove, as exemplified by groove 118 shown for wheel 114, extending about its perimeter and radially inwardly from the circumference thereof. These grooves receive the driving projections which are part of center links in the usual saw chain, shown for saw chain 120 in FIG. 3 at 122. Saw chain is supported on these pulleys as shown in FIG. 3 with these driving projections within the grooves and with side links in the saw chain resting on edge portions of the wheels located on either side of these grooves.

Located intermediate pulleys 114, 116, and on the same side of plate 108 as the pulleys, is a chain support member or chain support 124. This chain support is provided with a groove 126 extending along its length which is in alignment with the grooves extending about the pulleys or wheels and adapted for the purpose of receiving projections 122. The chain support has a substantially flat top over most of its length, but is recessed, as at 128, at the left end thereof, as such is shown in FIGS. 3 and 4.

The chain support is secured by fastener 130 to the upper end of an upright but slightly inclined arm 132. The bottom end of this arm is pivotally mounted by pivot means 134 on frame plate 108. With loosening of fastener 130, the attitude of the chain support may be adjusted. Pivot means 134 provides a mounting for the chain support whereby such is moveable in a slightly arcuate path which inclines upwardly as the mechanism is viewed in FIG. 3 on movement of the support to the right. This is because when arm 132 swings from the position shown in FIG. 3 to the position shown in FIG. 4, it moves from an inclined to a more upright position.

Pivot means 134 is partially formed by a rod 136 secured to arm 132 which is rotatably mounted in the mechanism and which extends rearwardly and away the viewer in FIG. 3, through frame plate 108 to an end located behind box-shaped frame 106. This end is attached to a lever arm 138. Joined as by welding to the base of base plate 102 is a bracket 140. Cooperating abutment stops 142, 144 are mounted on this bracket and an end of lever arm 138, respectively, which come into contact and prevent counterclockwise movement of arm 132 from the position shown in FIG. 3. The arm, however, is moveable in a clockwise position, as earlier described, against the biasing of a coil spring 146 extending from the lever arm to bracket 140.

Cutter link 120a of chain 120 in FIG. 3 is shown supported on the chain support and occupying a pre-grinding position thereon. Engaging the rear and top of the cutter link with the link in this position is a cam pad 150 which is part of a cam-acting chain positioner in the mechanism. This cam pad, which extends transversely across the chain, has an end thereof, i.e. the end which is remote from the viewer in FIG. 3, secured to an arm 152 which inclines downwardly from the cam pad, in a region disposed intermediate the frame plate 108 and the chain which is supported on the pulleys. The lower end of arm 152 is joined to a shaft 156 which extends away from the viewer in FIG. 3 through a slide member 158, and thence to a connection with a counter weight arm 160 (visible in FIG. 1). Slide member 158 is slidably mounted in a slot 162 provided in frame plate 108. Shaft 156, where it extends through the slide member, is rotatable therewithin. The counter weight arm, through gravity action, tends to urge arm 152 in a counterclockwise direction in FIG. 3.

A rod 166 joined with slide member 158 extends to the right in FIG. 3, away from the side member, and through an accommodating bore made in frame plate 108, to a headed end 168 disposed outwardly of the edge of the frame plate. Pivotally mounted at 170 on the frame plate is an actuating handle 172. The actuating handle adjacent its upper end is forked, and the forks so formed straddle rod 166 inwardly of headed end 168. An operator, through hand manipulation of the lower protruding of handle 172, may swing the handle so that it moves from the full line to the dash line position shown in FIG. 3. This produces movement of rod 166 to the right, and together with the rod, movement to the right of slide member 158 and the lower end of the arm 152 (which in effect is pivotally connected to the slide member). Coil spring 174 encircling the rod in slot 162 yieldably resists this movement.

Suitably mounted on and extending laterally from a lower portion of frame plate 108 is an elongate threaded shaft 180. Actuating handle 172 is suitably apertured whereby such shaft may loosely extend therethrough. Screwed on to the shaft, and adjustable in position therealong by turning them, are a pair of thumb nut abutments 182, 184. These abutments serve to limit the swinging movement afforded the handle, and thus define the amount of movement permitted slide member 158 and its pivot connection with the lower end of pad arm 152.

Referring to FIGS. 1 and 2, a plate 190 secured to the main frame of the grinding machine carries at the base thereof a swinging arm 192 which may be swung in a vertical plane about horizontal axis 194. The lower end of this arm carries an adjustable abutment screw 196. With the arm positioned as shown in FIG. 1 and lowered, the end of the abutment screw by contacting horizontal expanse 88 of the swingable frame limits inward movement of the swingable frame with the frame located on one side of the grinding wheel's axis. The arm is swung upwardly and out of the way, to permit the swingable frame to be moved from one side of the machine past the axis of the grinding wheel to the other side of the machine. Another adjustable abutment screw (not shown) is provided on a swinging arm 200, such arm being shown in a raised position in FIG. 2. This arm and its abutment screw with the arm lowered perform a similar function of limiting inward movement of the swingable frame with the swingable frame swung to the opposite side of the machine.

Describing the operation of the grinding machine and mechanism 100 which has just been described for supporting the saw chain, an operator, through hand pulling on the depending left reach of the saw chain in FIG. 3, tensions this reach to cause the heel of the cutter in a cutter link to engage cam pad 150. The cutter link in this position is supported on and projects upwardly from the straight portion of chain support 124. The lower portion of cam pad 150 which is located to the left in FIG. 3 engages side links in the chain which follow the cutter link, and force such downwardly into recess 128. Positioning of the cutter link in this pre-grinding position is done with swingable frame 70 swung outwardly by the operator so that the grinding wheel is completely clear of the cutter link.

After thus being positioned, swingable frame 70 is swung inwardly slightly, to bring the cutter link toward the grinding wheel edge, with the grinding wheel and its edge then occupying the position shown in FIG. 3, where the edge protrudes downwardly into the link and into the gullet which separates the depth gauge and the cutter of the link. This position is determined by the swingable frame engaging one of the abutment screws, exemplified by screw 196.

With the cutter link and grinding wheel so relatively positioned, the operator then swings actuating handle 172 to swing it from right to left as shown in FIG. 3.

This produces a pulling action on the lower end of pad arm 152, causing the cam pad to be forced downwardly on the rear of the cutter link and at the same shifting the cutter link from left to right as illustrated in FIG. 3. The chain support moves with the cutter link. With movement of the chain support, arm 132 moves to a more upright position, as can be seen by comparing FIGS. 3 and 4. As a consequence, along with movement from left to right, the support and the link that is mounted thereon, raises slightly, the amount of such raising depending upon the amount of movement that has occurred. With raising of the cutter link, a deeper penetration of the edge of the grinding wheel into the gullet and toward the base of the cutter link occurs.

Movement by the operator is continued until the grinding surface at the edge of the grinding wheel engages and then grinds off the cutting edge of the cutter. The amount ground is determined by the operator and adjustments made in controlling movement of the actuating handle. With a sharpened edge produced in the cutter, the actuating handle is released, with spring 174 then returning slide member 158 to its original position. The chain support also returns to its original position, through the biasing of spring 146.

It will be noted that through the camming action described, the cutter link is held firmly by the support during the grinding operation. The recess in support 124 receiving the links following the cutter link, and the action of the pad, whereby such links move into the recess, assure that the chain support move with the cutter link under the action of the cam pad.

It is particularly important to note that the mounting for the chain support and the action of the cam-acting chain positioner is such that with the sharpening of old chain, where the cutting edge of the cutter is relatively near the rear end of the cutter, the grinding wheel edge protrudes farther into the gullet to produce a ground edge which is deeper into the tooth than with a relatively new cutter link. This results from the lifting action produced in the chain support which occurs simultaneously which movement of the chain support from left to right in FIG. 3.

After grinding of a cutter in a cutter link, the operator may position a succeeding cutter link of the same hand in the pre-grinding position described by pulling on the reach of chain draped over the right pulley in FIG. 3. This moves the depth gauge of a following link under cam pad 150, and the cam pad swings upwardly to permit the cutter link to pass completely thereunder. This pulling is continued until another link of the same hand, i.e. cutter link 120b in FIG. 3, has been moved slightly beyond the cam pad. After such has occurred, the operator tenses the left expanse of the chain to pull the rear end of this cutter link against the forward underlying portion of the cam pad. Cutter link 120b then occupies the pre-grinding position shown for cutter link 120a in FIG. 3.

To grind links of opposite hand in the chain, swingable frame 70 is lowered by shifting sleeve 86 downwardly, and with this sleeve the swingable frame 70. This enables frame 70 and mechanism 100 supported thereon freely to move under the grinding wheel to the opposite side of the axis of the grinding wheel. With the mechanism 100 located on the opposite side of the axis of the grinding wheel, grinding of the cutters in the links of opposite hand may be performed in essentially the same manner as earlier described.

It will noted that a grinding mechanism has been described which through the operation of a cam-acting chain positioner enables in a relatively simple manner successive cutter links to be properly positioned on the chain support in a pre-grinding position. The chain positioner is relied upon to produce movement of the cutter link whereby the cutter of the link moves against the grinding wheel surface. Movement of the link is such that as the edge to be sharpened moves against the wheel, there is a slight lifting of the cutter link, so that with an older link greater penetration of the cutting edge into the gullet results. The grinding mechanism is fully adjustable, to produce the exact type of ground cutting edge desired by the operator for any given type of tooth.

While an embodiment of the invention has been described, it should be obvious that modifications and variations are possible without departing from the invention.

It is claimed and desired to secure by Letters Patent:

1. In a grinding machine for grinding the cutter of a cutter link in saw chain, the link including a gullet disposed forwardly of the cutter, the machine including a power-driven grinding wheel of grinding the cutter, the improvement comprising:

a saw chain support for supporting a portion of saw chain which includes a cutter link during grinding of the cutter in the link, with the cutter of the link projecting outwardly from the support, a mounting for the support defining a path of movement for the support which extends generally longitudinally of the link held by the support, a cam-acting chain positioner engageable with the rear and top of the cutter of the cutter link supported by said support, means for moving the positioner whereby such moves the link it has engaged in a direction extending longitudinally of the link with the link moving forwardly while supported on the support, said positioner during such movement camming the rear of the link against the support and said support by reason of the camming moving along with the link.

2. The grinding machine of claim 1, which further includes a mounting for the grinding wheel, said mounting for the support and said grinding wheel being relatively positionable to place the peripheral edge of the wheel within the gullet of the link and in advance of the cutter in the link, the mounting for the support defining a path of movement extending generally longitudinally of the link and also in a direction causing the edge of the wheel to extend further into the gullet as the cutter advances toward the wheel.

3. The grinding machine of claim 1, wherein said support is recessed whereby links in a saw chain disposed rearwardly of a cutter link occupying the support may drop below the cutter link, and said chain positioner engages these rearwardly disposed links to force them below the cutter link with the positioner engaging the rear and top of a cutter portion.

4. In a saw chain grinder, including a frame and a power-driven grinding wheel supported on said frame with a portion of the edge of the wheel positioned in a work station of the grinder whereby to grind the leading edge of the cutter of a cutter link, a saw chain support adapted moveably to support a saw chain cutter link, the support being moveable from a position on the infeed side of the cutting station into the cutting station, a cam-acting chain positioner, means mounting said positioner on said frame for movement of the positioner to a position where the positioner overlies and engages the rear end of a cutter in a cutter link occupying said support, and means for moving the positioner to shift a cutter link engaged by the positioner together with said support toward said cutting station and said positioner during such movement exerting a force on the cutter link urging the link against the chain support.

5. In a grinding machine including a grinding wheel for grinding the cutter of a cutter link, the improvement comprising:

a chain support for supporting a cutter link during grinding of a cutter in the link by the grinding wheel with the link projecting upwardly from the chain support, a pad disposed above a cutter link supported on said chain support and engaging the top and rear of the cutter in the cutter link, and means for moving the pad whereby such is forced downwardly on the top and rear of the cutter to force the cutter link against the support while moving the pad in a direction extending generally longitudinally of the cutter link and with the cutter link moving forwardly.

6. The grinding machine of claim 5, which further comprises an arm, and pivot means pivotally mounting the arm, said pad being mounted on said arm at a point remote from said pivot means, the means for moving said pad comprising means for moving said pivot means.

7. The grinding machine of claim 5, which further comprises another pivot means disposed below the chain support pivotally mounting the support for movement in an arcuate path, and wherein movement of said cutter link is accompanied with movement of said support in said arcuate path.

8. In a grinding machine including a grinding wheel for grinding the cutter of a cutter link, the improvement comprising:

a chain support for supporting a cutter link during grinding of the cutter in the link by the grinding wheel with the link projecting upwardly from the chain support, pivot means disposed below said chain support pivotally mounting the support for movement in an arcuate path, a pad disposed above a cutter link supported on said chain support and engageable with the top and rear of the cutter in the link, and means for moving the pad whereby the pad is forced downwardly on the top and rear of the cuter to urge the cutter link against the support and whereby the pad moves the cutter link and the support together along said arcuate path.

9. The grinding machine of claim 8, which further comprises an arm and pivot means pivotally mounting the arm, said pad being mounted on said arm at a point remote from said pivot means, the means for moving the pad comprises means for moving said pivot means and together with said pivot means said arm and the pad connected to said arm.

10. In a saw chain grinder for grinding the cutter of a cutter link, the cutter link in addition to the cutter including a depth gauge at the forward end thereof and a gullet separating the cutter and depth gauge, the grinding machine further including a chain support for supporting the cutter link in the saw chain and a power-driven grinding wheel, the support and grinding wheel being relatively positionable to place the edge of the grinding wheel with such protruding into the gullet of the cutter link, the improvement comprising:

a mounting for the chain support defining a movement path for the support whereby the support moves a cutter link supported thereon with the cutter thereof advancing toward the edge of the grinding wheel and with the grinding wheel at the same time increasing its penetration into the gullet, and a cam-acting chain positioner, means for placing the positioner with the positioner engaging the rear and top of the cutter of the cutterlink, and means for moving the positioner after such engagement to force the cutter link against said support and produce movement of said support along said path.

11. A grinding machine for grinding the cutter of a cutter link in saw chain, the link including a gullet disposed forwardly of the cutter, the machine comprising:

a main frame and a power-driven grinding wheel mounting on said main frame in a position elevated above the ground and with the wheel inclined from horizontal whereby the wheel has a lower edge portion disposed below the center of the wheel, a swingable frame and a swing mounting for said swingable frame accommodating swinging of the swingable frame about an upright axis, saw chain support mechanism mounted on said swingable frame in a position disposed generally below the center of the wheel and to one side of the center of the wheel, said saw chain support mechanism including a chain support member adapted to mount the cutter link of a saw chain with the cutter of the link projecting upwardly from the support member, said chain support member being swingable while said mechanism is located on one side of the center of the wheel to move a cutter link mounted thereon into a position where the lower edge of the wheel enters the gullet of the cutter link, said mounting for the swingable frame including means for lowering the swingable frame to place the swingable frame at a lower elevation so that the saw chain support mechanism may be swung with swinging movement of said swingable frame to the other side of the center of the grinding wheel while moving under the wheel.

* * * * *